US009985864B2

(12) United States Patent
Gruber et al.

(10) Patent No.: US 9,985,864 B2
(45) Date of Patent: May 29, 2018

(54) HIGH PRECISION PACKET GENERATION IN SOFTWARE USING A HARDWARE TIME STAMP COUNTER

(75) Inventors: Matei Gruber, Bucharest (RO); Adrian Stanciu, Bucharest (RO)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 517 days.

(21) Appl. No.: 12/850,505

(22) Filed: Aug. 4, 2010

(65) Prior Publication Data
US 2012/0033562 A1 Feb. 9, 2012

(51) Int. Cl.
H04L 12/26 (2006.01)
H04L 1/16 (2006.01)
H04L 1/00 (2006.01)

(52) U.S. Cl.
CPC ........... *H04L 43/50* (2013.01); *H04L 43/08* (2013.01); *H04L 43/106* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 6,148,051 A | 11/2000 | Fujimori | |
| 6,526,259 B1 | 2/2003 | Ho | |
| 6,820,133 B1 * | 11/2004 | Grove | H04L 29/12066 709/238 |
| 6,961,285 B2 * | 11/2005 | Niemiec et al. | 368/10 |
| 7,099,438 B2 | 8/2006 | Rancu et al. | |
| 7,327,686 B2 | 2/2008 | Standridge | |
| 7,424,080 B1 | 9/2008 | Liu | |
| 7,433,069 B2 * | 10/2008 | Masuda et al. | 358/1.15 |
| 7,561,559 B2 | 7/2009 | Hannel et al. | |
| 7,689,702 B1 * | 3/2010 | Tripathi et al. | 709/230 |
| 7,990,887 B2 * | 8/2011 | Cidon et al. | 370/253 |
| 2002/0037008 A1 | 3/2002 | Tagami | |
| 2002/0073228 A1 | 6/2002 | Cognet et al. | |
| 2003/0012141 A1 | 1/2003 | Gerrevink | |
| 2003/0099243 A1 | 5/2003 | Oh et al. | |

(Continued)

FOREIGN PATENT DOCUMENTS

EP 1 583 279 A2 10/2005

OTHER PUBLICATIONS

The Ixia 200 Traffic Generator and Analyzer, Product Description, 1997-1999.

(Continued)

*Primary Examiner* — Lonnie Sweet

(57) ABSTRACT

There is disclosed a system and method for high precision packet generation in software using a hardware time stamp counter. The method may include receiving user selection to create a network test and receiving test information from the user, the test information including a packet transmission rate. A packet transmission interval may be calculated based on the packet transmission rate. The network test is executed. Packets are transmitted at the packet transmission rate, including checking a hardware counter to learn if the packet transmission interval has elapsed and, when the packet transmission interval has elapsed, sending the packet over a network. The method may be performed by a network testing system or computing device.

3 Claims, 4 Drawing Sheets

(56) References Cited

U.S. PATENT DOCUMENTS

| | | |
|---|---|---|
| 2003/0179777 A1 | 9/2003 | Denton et al. |
| 2003/0231741 A1 | 12/2003 | Rancu et al. |
| 2007/0025261 A1 | 2/2007 | Ginsberg et al. |
| 2008/0117907 A1 | 5/2008 | Hein |
| 2010/0020829 A1 | 1/2010 | Ruffini |
| 2011/0134766 A1* | 6/2011 | Zampetti et al. ............. 370/252 |
| 2011/0185217 A1* | 7/2011 | Eyermann ................. G06F 1/14 713/502 |

OTHER PUBLICATIONS

Ixia 200 Chassis, Product Description.
Intel 64 and IA-32 Architectures Software Developer's Manual, vol. 2B: Instruction Set Reference, N-Z, Dec. 2009, pp. 4-345 through 4-348.
Intel Corporation, The Time-Stamp Counter, article, 1998, last accessed on Jan. 7, 1998, pp. 1-12.
Sugerman et al., Proceedings of the 2001 USENIX Annual Technical Conference, USENIX Association, Boston, Massachusetts, Jun. 25-30, 2001.
Unknown, Time Stamp Counter, Wikipedia, the free encyclopedia, http://en.wikipedia.org/wiki/Time_Stamp_Counter, last accessed Jun. 29, 2010, pp. 1-3.
Unknown, ESX Server Performance and Resource Management for CPU-Intensive Workloads, VMware White Paper, pp. 1-23.
Unknown, Timekeeping in VMware Virtual Machines, VMware information Guide, pp. 1-26.

\* cited by examiner

HIGH PRECISION PACKET GENERATION IN SOFTWARE USING A HARDWARE TIME STAMP COUNTER

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to network communications and, more specifically, to generating packets in software using a hardware time stamp counter.

2. Description of the Related Art

Networks such as the Internet carry a variety of data communicated using and through a variety of network devices including servers, routers, hubs, switches, and other devices. Before placing a network into use, the network, including the network devices, network media, network segments and network applications included therein, may be tested to ensure successful operation. Network devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, modifying, analyzing and/or sending network communications. The network testing systems may be used to evaluate how well a network device or network segment handles data communication, streaming media and voice communications.

DETAILED DESCRIPTION

Apparatus

Figure 1:
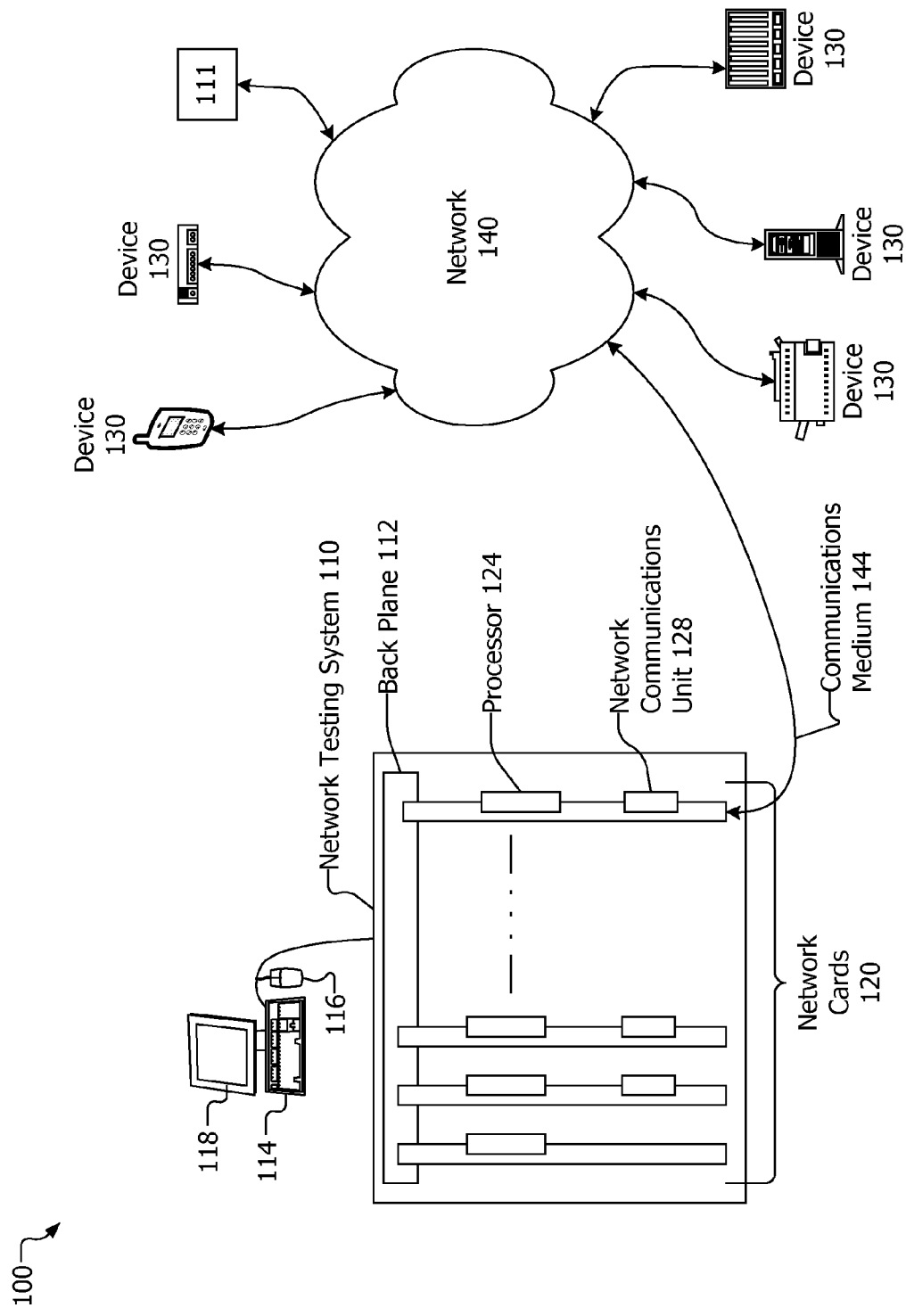
FIG. 1 is a block diagram of a first environment in which high precision packet generation in software using a hardware time stamp counter may be implemented.

FIG. 1 is a block diagram of a first environment 100 in which high precision packet generation in software using a hardware time stamp counter may be implemented. The environment 100 shows a network testing system 110 in which methods for receiving, processing and executing network tests may be implemented. The network test may be system default tests and may be user modified or user specified. The environment 100 includes network testing system 110 coupled via at least one network card 120 to a network 140 over a communications medium 144. The network testing system 110 may include or be one or more of a performance analyzer, a conformance validation system, a network analyzer, a packet blaster, a network management system, a combination of these, and/or others.

The network testing system 110 may be used to evaluate or measure characteristics and performance of a network communication medium, a network application, a network communications device or system, including the throughput of network traffic, the number of dropped packets, jitter, packet delay, and many others. Such testing may be used to evaluate the Mean Opinion Score (MOS) or R-value score of a voice transmission, a video quality score or rating, a broadband quality score, or other similar media transmission score for a communication over a network or portion thereof and/or through a network communications device. The network testing system may be used to evaluate the performance of servers, network communications devices such as, for example, routers, gateways, firewalls, load balancers, and other network devices, as well as network applications and other software.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a back plane 112. The network cards 120 may be coupled with back plane 112. One or more network cards 120 may be included in network testing system 110. The network cards 120 may be permanently installed in the network testing system 110, may be removable, or may be a combination thereof.

The network testing system 110 and/or one or more of the network cards 120 may include an operating system such as, for example, versions of Linux, Unix and Microsoft Windows.

Network card 120 is coupled with network 140 via a communications medium 144. Although a single connections over communications medium 144 is shown, each of the network cards 120 may be connected with network 140 over a communications medium. In one embodiment, the network cards may have two or more connections each over a communications medium with the network 140 and/or with multiple networks. The communications medium may be, for example, wire lines such as an Ethernet cable, fibre optic cable, and coaxial cable, and may be wireless.

The network testing system 110 and the network cards 120 may support one or more well known higher level (OSI Layers 3-7) communications standards or protocols such as, for example, one or more versions of the User Datagram Protocol (UDP), Transmission Control Protocol (TCP), Internet Protocol (IP), Internet Control Message Protocol (ICMP), Internet Group Management Protocol (IGMP), Stream Control Transmission Protocol (SCTP), Session Initiation Protocol (SIP), Hypertext Transfer Protocol (HTTP), Address Resolution Protocol (ARP), Reverse Address Resolution Protocol (RARP), File Transfer Protocol (FTP), Real-time Transport Protocol (RTP), Real-time Transport Control Protocol (RTCP), Real-Time Streaming Protocol (RTSP), the Media Gateway Control Protocol (MEGACO), the Session Description Protocol (SDP), Border Gateway Protocol (BGP), Enhanced Interior Gateway Routing Protocol (EIGRP), Multiple Spanning Tree Protocol (MSTP), Open Shortest Path First (OSPF), Protocol-Independent Multicast—Sparse Mode (PIM-SM), Intermediate System to Intermediate System (IS-IS or ISIS), Per-VLAN Spanning Tree Plus (PVST+), Rapid Per-VLAN Spanning Tree Plus (RPVST+), and Simple Mail Transfer Protocol (SMTP); may support one or more well known lower level communications standards or protocols (OSI Layers 1-2) such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®); may support proprietary protocols; and may support other protocols. Each network card 120 may support a single communications protocol, may support a number of related protocols, or may support a number or combination of related or unrelated protocols.

The term "network card" as used herein encompasses line cards, test cards, analysis cards, network line cards, load modules, interface cards, network interface cards, data interface cards, packet engine cards, service cards, smart cards, switch cards, relay access cards, CPU cards, port cards, and others.

The network cards 120 may include one or more processors 124 and one or more network communications units 128. The processor must have a register that serves as a time stamp counter. In one embodiment, the processor is or conforms to an Intel x86 family processor with a time stamp counter. In this embodiment, the time stamp counter is a 64-bit register included with Intel x86 processors since the Pentium. The time stamp counter (TSC) register increments or counts at regular, uniform intervals from when the processor chip is powered on. In one embodiment, the TSC register increments every 5 microseconds. In some processors, the time stamp counter increments with every internal processor clock cycle, in others, the time-stamp counter increments at a constant rate. The constant rate may be determined in different ways depending on the processor chip.

In another embodiment, the network cards 120 may have no processors 124 and may include one or more network communications units 128. In the embodiment in which the network cards do not include a processor, processing may be performed by a processor on a motherboard of the network testing system 110, in a computer coupled with the network testing system, on another card, on the backplane or by a remote or external unit. When the network card 120 includes two or more network communications units 128, the network card 120 is in effect two or more network capable devices. That is, a network card 120 having n network communications units 128 may function as n network capable devices.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols. The network communications unit 128 may include a network interface through which the network card 120 may transmit and/or receive communications over the network 140.

The network card 120 may include and/or have access to local and/or remote memory, storage media and storage devices. Instructions to be executed by the processor 124 may be stored on and executed from a local or remote machine readable medium or storage device. A machine readable medium includes, for example, without limitation, magnetic media (e.g., hard disks, tape, floppy disks), optical media (e.g., CD, DVD, BLU-RAY DISC®), flash memory products (e.g., MEMORY STICK®, COMPACT FLASH® and others), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium. Storage devices include hard disk drives, magnetic tape, solid-state drives (SSDs), DVD drives, BLU-RAY DISC® drives, flash memory devices, and others.

The processor 124, network communications unit 128, and memory may be included in one or more FPGAs, PLAs, PLDs on the network card 120. Additional and fewer units, hardware and firmware may be included in the network card 120.

The back plane 112 may serve as a bus or communications medium for the network cards 120. The back plane 112 may also provide power to the network cards 120.

The network testing system 110 may have a computer (not shown) coupled thereto. The computer may be local to or remote from the network testing system 110. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or backplane included in the chassis.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the network capable devices 130 in the network 140. The network testing system 110 may be used to test and evaluate the network 140 and/or portions thereof, network capable devices 130, applications running on network capable devices 130, and/or services provided by network 140 and/or network capable devices 130 and/or network applications. The network testing system 110, the network cards 120, and the network communications units 128 may all be network capable devices.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these. The network 140 may be comprised of a single or numerous nodes providing numerous physical and logical paths for data units to travel. Each node may be a network capable device as described below. A node may be a computing device, a data communications device, a network capable device, a network card, or other devices as defined and described herein.

Communications on the network 140 may take various forms, including frames, cells, datagrams, packets, messages, higher level logical groupings, or other units of information, all of which are referred to herein as packets. Those packets that are communicated over a network are referred to herein as network traffic. The network traffic may include packets that represent electronic mail messages, streaming media such as music (audio) and video, telephone (voice) conversations, web pages, graphics, documents, and others.

The network capable devices 130 may be devices capable of communicating over the network 140 and/or listening to, injecting, delaying, dropping, relaying, processing, and/or modifying network traffic on network 140. The network capable devices 130 may be computing devices such as computer workstations, personal computers, servers, portable computers, set-top boxes, video game systems, media players such as BLU-RAY DISC® players, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; testing equipment such as network analyzing devices, network conformance systems, emulation systems, network monitoring devices, and network traffic generators; components such as processors, network cards and network communications units; and networking devices such as routers, relays, firewalls, hubs, switches, bridges, traffic accelerators, and multiplexers. In addition, the network capable devices 130 may include home appliances such as refrigerators, washing machines, and the like as well as residential or commercial heating, ventilation, and air conditioning (HVAC) systems, alarm systems, may also include point of sale systems and bank teller machines, and other devices or systems capable of communicating over a network. One or more of the network capable devices 130 may be devices to be tested and may be referred to as devices or systems under test.

The network testing system 110 may send communications over the network 140 to a or through a network capable device 130. The destination of communications sent by the network testing system 110 may be a device under test such as a network capable device 130, may be the network testing system 110 such as a test between two network cards in the same network testing system 110, and may be a second network testing system 111. The network testing system 111 may be similar to or the same as network testing system 110. A first network card 120 in the network testing system 110 may send communications over the network 140 to a or through a network capable device 130 that are received by a second network card 120 in the network testing system 110 or are received by a third network card in the network testing system 111. A first network communications unit in a first network card in the first network testing system 110 may send communications over the network 140 to a second network testing system 111, and a second network communications unit the first network card in the first network testing system 110 may receive communications over the network 140 from the second network testing system 111. A first network communications unit in a first network card in the network testing system 110 may send communications over the network 140 and optionally through a network capable device 130 to a second network communications unit on the same network card in the same network testing system. The network testing system 110 may listen to and capture communications on the network 140.

The methods described herein may be implemented on one or more FPGAs and/or other hardware devices, such as, for example, digital logic devices. The methods described herein may be implemented as software, namely network testing software, running on a network testing system and executed by a processor, such as a processor on a network card, a processor in a computer coupled with the network testing system, or a processor in a network testing system. The network testing software may be stored on a volatile or nonvolatile memory device or storage medium included in or on and/or coupled with a computing device, a network testing system, a network card, or other card. The methods may be implemented on one or more network cards 120 in a single network testing system or may be implemented on one or more network cards 120 on each of two or more network testing systems.

Figure 2:
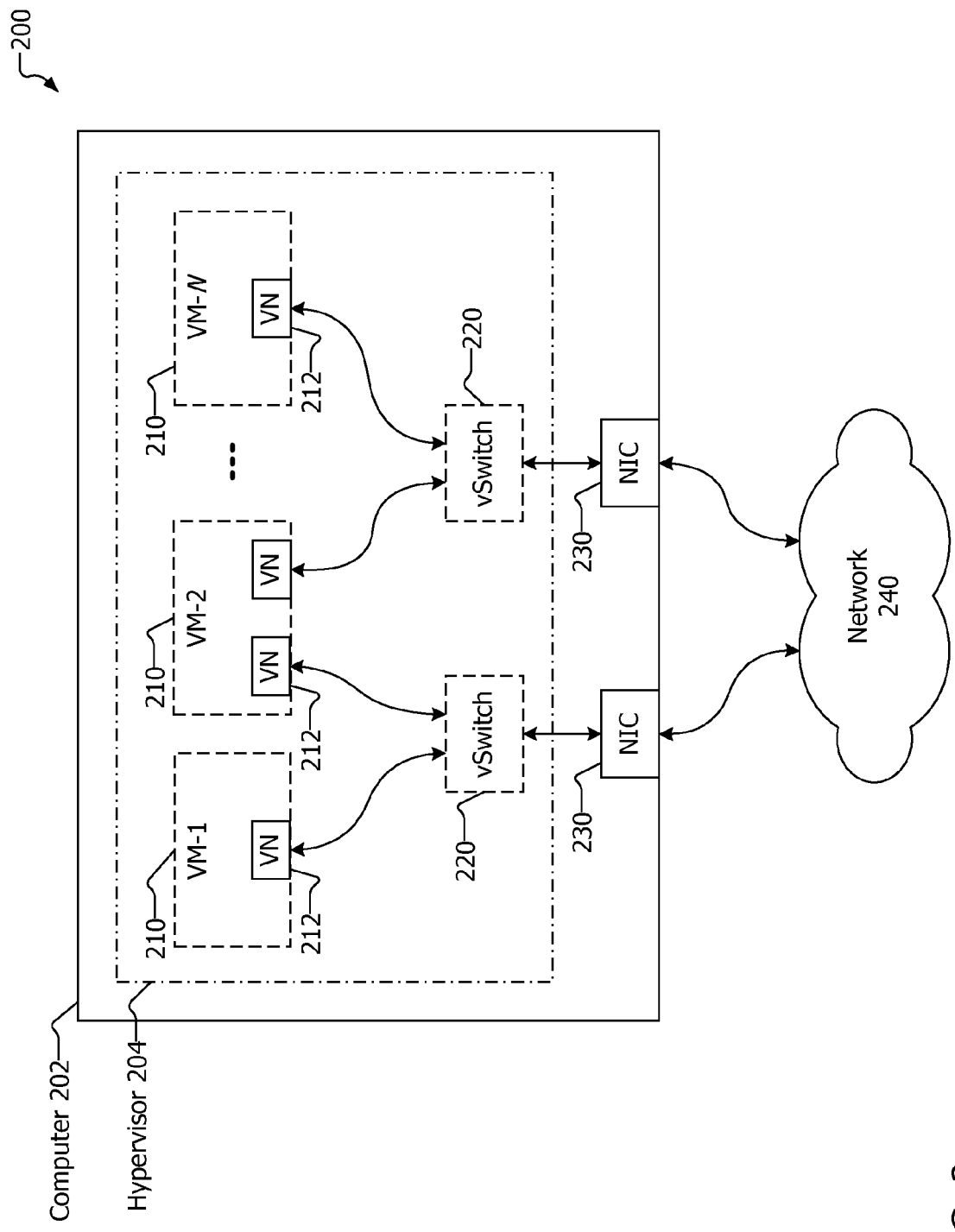
FIG. 2 is a block diagram of a second environment in which high precision packet generation in software using a hardware time stamp counter may be implemented.

The testing environment shown in FIG. 1 may be virtualized such that some of the hardware components of the network testing system are implemented virtually as software. FIG. 2 is a block diagram of a second environment in which high precision packet generation in software using a hardware time stamp counter may be implemented. In this environment, the network testing system may be a computer 202 having a processor and memory (e.g., RAM), and run software that supports virtualization. Other typical components of a computer are included in or coupled with computer 202, namely user input devices, non-volatile storage media, etc. The processor must have a register that serves as a time stamp counter. In one embodiment, the processor is or conforms to an Intel x86 family processor with a time stamp counter.

The virtualization software may be virtual machine software such as hypervisor 204. Hypervisor 204 or other virtualization software may run concurrently with an existing operating system on computer 202 or may run independently such that no operating system is provided on computer 202. In one embodiment, the virtualization software is the ESX® product available from VMware, Inc. of Palo Alto, Calif. that provides a hypervisor or virtual machine monitor. In the hypervisor 204 or other software that supports virtualization, one or more virtual machines 210 may be established to run multiple instances of network testing software. In one embodiment, each of the virtual machines 210 is a virtualization of a network card 120 described above regarding FIG. 1 and shares the features and characteristics of the network cards 120. Each of the virtual machines has one or more virtual network communications units (VN) 212. The virtual network communications units VN 212 are virtualizations of network communications units 128 and share the features and characteristics of the network communications units 128. In another embodiment, each of the virtual machines 210 is a virtualization of a network testing system 110 described above regarding FIG. 1.

The computer 202 may include one or more network communications units (NCU) 230 to communicate over a network 240. The NCU 230 is the same or similar to the NCU 128, and the network 240 is the same or similar to the network 140, both described above regarding FIG. 1. Various devices (not shown) may be coupled with network 240 just as devices 130 are coupled with network 140.

In either environment, the network testing software may provide a graphical user interface that allows users to prepare network tests, view the results of network tests, monitor network traffic, and perform other actions. The network testing software may support or provide access to tests and analysis of network traffic according to a plurality of communications protocols, including higher level and/or lower level communications protocols.

Figure 3:
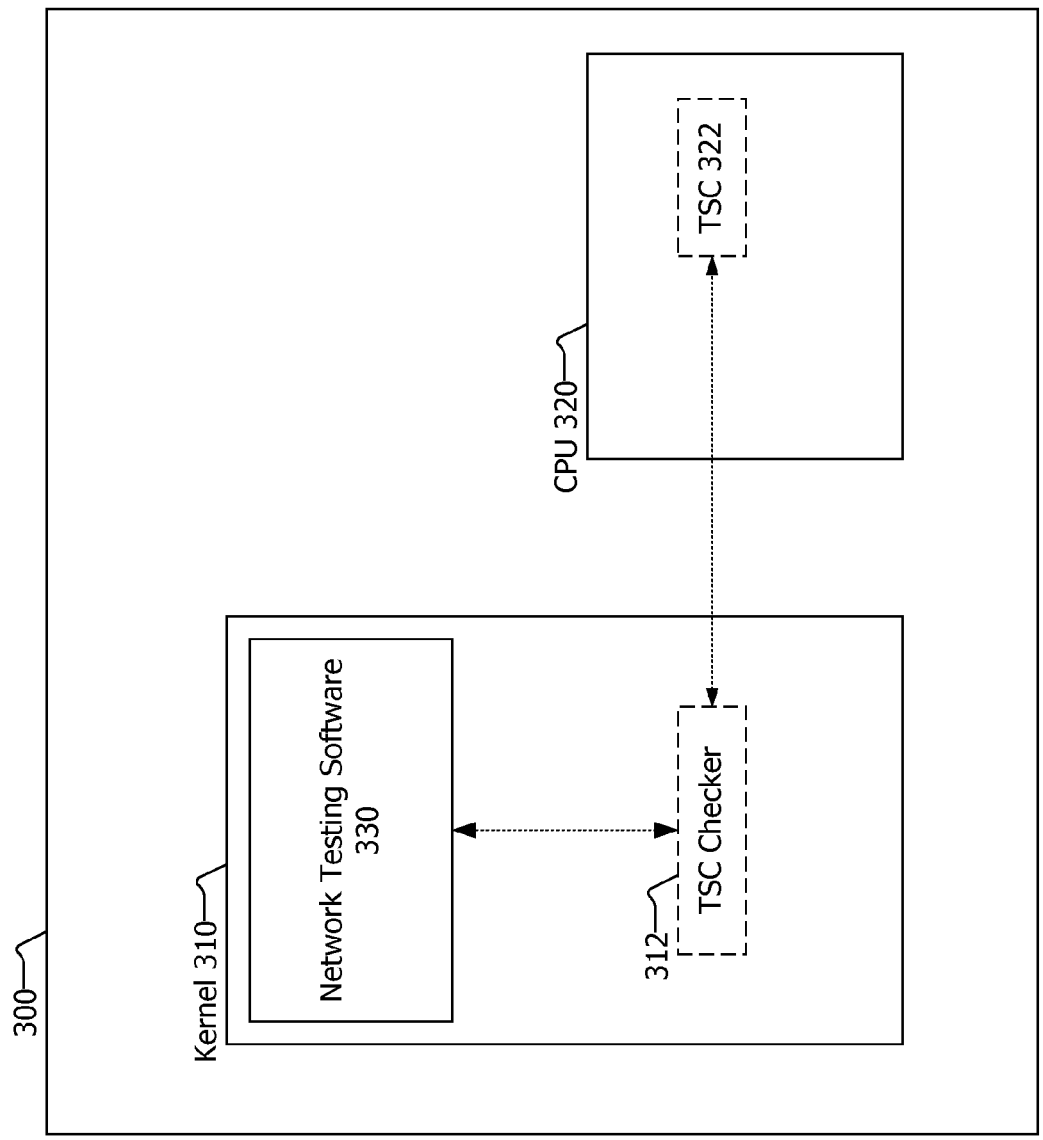
FIG. 3 is block diagram of components within a computer that may be used to implement high precision packet generation in software using a hardware time stamp counter.

FIG. 3 is block diagram of a components within a computer 300 that may be used to implement high precision packet generation in software using a hardware time stamp counter register in a processor. In one embodiment, computer 300 includes an operating system with a kernel 310. The kernel 310 is the heart of, nucleus of, or core of an operating system and is the main or central component of an operating system. A TSC checker routine or module 312 is included with or may be added to the kernel 310 to access the TSC register 322 or similar counter register in a processor 320. A kernel routine is used because it is lightweight; that is, it uses a very small amount or limited amount of system resources such as memory and processor. The TSC register is used because it can be read quickly. On a system with a multi-core processor, the TSC checker routine may exclusively access the TSC register from a single core as the TSC registers in each core may not be synchronized or the same, or the cores in the CPU may be synchronized such that exclusive access is not required. The TSC checker 312 may be a single CPU instruction that reads from the CPU's TSC register 322. The TSC checker 312 provides network testing software 330 the ability to check on the time or count in the TSC register in an efficient and lightweight way. The network testing software 330 may be provided in the kernel 310 (as shown) or may be outside the kernel 310.

Methods

Figure 4:
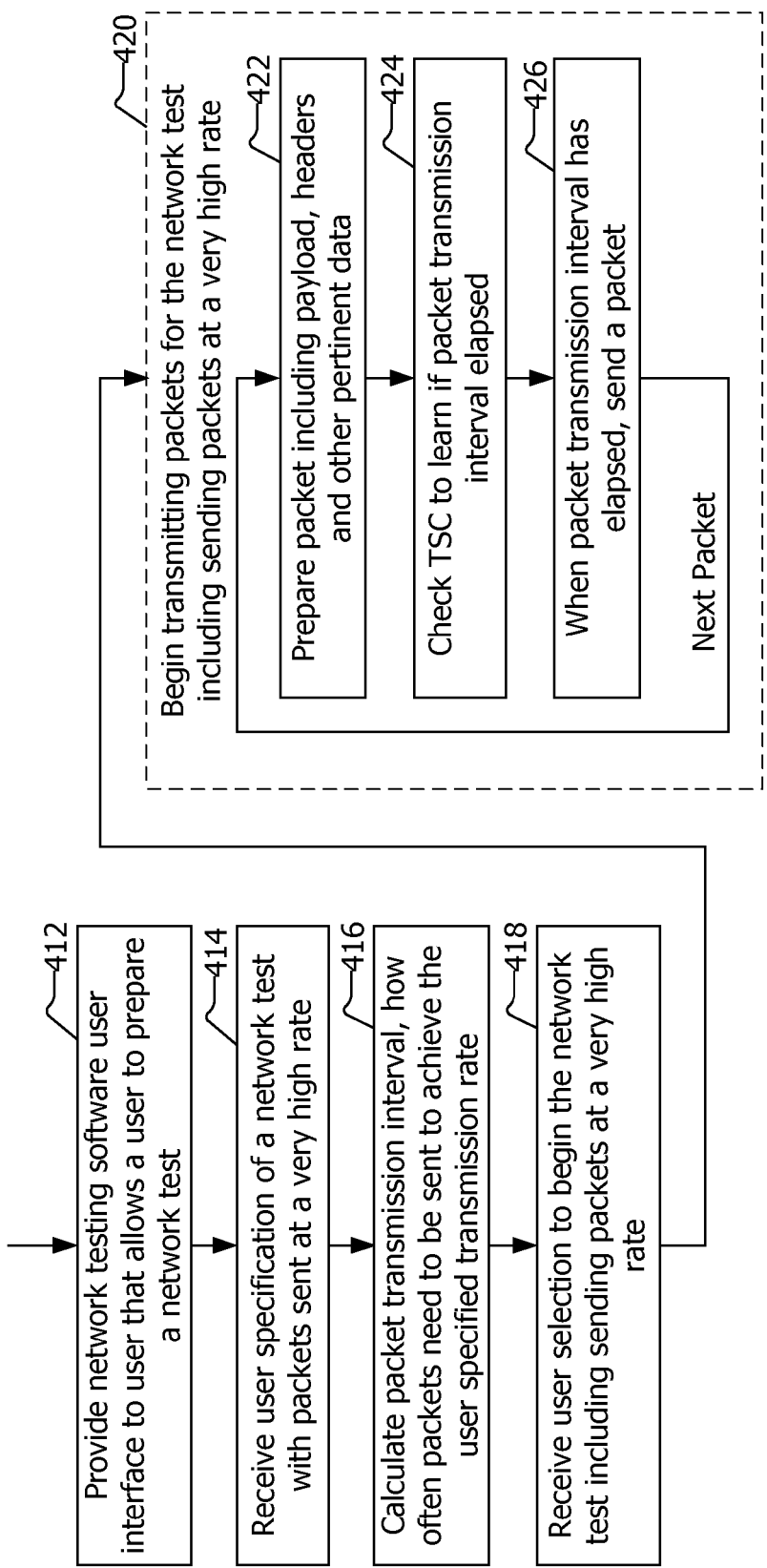
FIG. 4 is a flow chart of actions taken to implement a method of high precision packet generation in software using a hardware time stamp counter.

FIG. 4 is a flow chart of actions taken to implement a method of high precision packet generation in software using a hardware time stamp counter. The network testing software provides a network testing software user interface that allows a user to prepare a network test, as shown in block 412. The network testing software receives a user specification of a network test with packets sent at a very high transmission rate, as shown in block 414. That is, in specifying the network test, the user specifies that packets be sent to achieve a throughput of or have a transmission rate of one gigabit per second or multiple gigabits per seconds, with the packets being sent at an even or constant interval to achieve the specified throughput or rate. The user specification of a network test may include packet creation information, such as data or information about the payload and header for the packets in the network test. Packet creation information may also include a specification of one or more communications protocols to which the packets must conform. The network testing software provides a user interface that allows the user to specify these features. The network testing software may do this with a user interface that includes menus, text/number entry boxes, and/or through other user interface constructs or techniques. The network testing software calculates a packet transmission interval, that is, how often packets need to be sent to achieve the user specified transmission rate, as shown in block 416. For example, to achieve the specified transmission rate (or throughput), the network testing software may determine that packets be sent at a transmission interval of every 10 milliseconds, every 1 microsecond, every 5 microseconds, every 32 microseconds, every 128 microseconds, etc.

The network testing software receives a user selection to begin the user specified network test including sending packets at a very high rate, as shown in block 418.

The network testing software begins transmitting packets for the network test including sending packets at a very high rate, as shown in block 420. This includes the following actions. The network testing software preparing packet including payload, headers and other pertinent data, as shown in block 422. Packets may be prepared and placed in a queue. The network testing software checks the TSC to learn if the packet transmission interval has elapsed, as shown in block 424. The checking is performed using the TSC checker 312 and determining whether the packet transmission interval has elapsed using simple mathematics. That is, the network testing software makes a call to the TSC checker 312 to learn the current counter or increment on the TSC counter in the processor; the network testing software then considers the time that has elapsed between the current checked time and the last checked time. If the difference equals (or exceeds) the packet transmission interval, the packet transmission interval has elapsed. Packet preparation and checking the TSC in blocks 422 and 424 may be performed concurrently. When the packet transmission interval has elapsed, the network testing software sends a packet, as shown in block 426. The flow of actions continues at block 422 with the next packet and the next transmission interval such that the flow of actions loops from 422 to 424 to 426 and back again until all packets have been sent or the test is aborted. In this way, high precision packet generation in software using a hardware time stamp counter may be achieved.

The following is an example showing how the method may be used. In block 414 a user may specify a network test with 100 byte packets to be sent at a rate of 1000 bytes/second which amounts to 10 packets/second. The packet transmission interval that results from this user specification is one packet every 100 milliseconds, which would be calculated in block 416. The network testing software begins checking or actively monitoring the TSC time to learn whether the packet transmission interval, 100 milliseconds in this example, has elapsed (block 424). In this example, when 100 milliseconds has elapsed according to the TSC, the network testing software sends another packet (block 426). A determination of whether 100 milliseconds has elapsed is performed using arithmetic, for example, by subtracting a first stored time from a current time and evaluating whether the resulting difference is 100 milliseconds (or is greater than or equal to 100 milliseconds).

Depending on the user specified network test and the configuration of the hardware devices or virtual devices in the specific test environment, the same network testing system that transmits packets may receive, process and analyze the packets sent in the network test. In some configurations, a second network testing system may receive the packets that initiated from a network test on a first network testing system.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A network testing system having at least one network card, the network card including a processor, a hardware counter, a memory and a network communications unit, the network testing system coupled with a network, the network testing system having instructions stored thereon which when executed cause the network testing system to perform operations comprising:
   receiving user selection to create a network test;
   receiving test information from the user, the test information including a transmission rate and packet creation information;
   calculating a packet transmission interval based on the transmission rate, wherein the packet transmission interval defines how often packets will be sent to achieve evenness in packet transmissions during a time period at the user specified packet transmission rate;
   receiving user selection to execute the network test transmitting packets specified in the network test over the network at the packet transmission rate, including:
      preparing a packet including at least a payload and a header according to the packet creation information;
      directly accessing and checking the hardware counter to learn if the packet transmission interval has elapsed, wherein the hardware counter comprises a time stamp counter (TSC) register included within processor that increments or counts at regular uniform intervals from when the processor is powered on and wherein directly accessing the hardware counter includes reading the TSC register using a routine located within a kernel of an operating system executing on the network card; and
      when the packet transmission interval has elapsed, sending the packet over the network.

2. A computing device having at least one virtual machine executing network testing software, the computing device including a processor, a hardware counter, a memory and a network communications unit, the computing device coupled with a network, the network testing software comprising instructions which when executed cause the computing device to perform operations comprising:
   receiving user selection to create a network test;
   receiving test information from the user, the test information including a transmission rate and packet creation information;
   calculating a packet transmission interval based on the transmission rate, wherein the packet transmission interval defines how often packets will be sent to achieve evenness in packet transmissions during a time period at the user specified transmission rate;
   receiving user selection to execute the network test transmitting packets specified in the network test over the network at the packet transmission rate, including:
      preparing a packet including at least a payload and a header according to the packet creation information;
      directly accessing and checking the hardware counter to learn if the packet transmission interval has elapsed, wherein the hardware counter comprises a time stamp counter (TSC) register included within processor that increments or counts at regular uniform intervals from when the processor is powered on and wherein directly accessing the hardware counter includes reading the TSC register using a routine located within a kernel of an operating system executing on the network card; and
      when the packet transmission interval has elapsed, sending the packet over the network.

3. A non-transitory machine readable storage medium having instructions stored thereon which when executed cause a computing device to perform operations comprising:
   receiving user selection to create a network test;
   receiving test information from the user, the test information including a transmission rate and packet creation information;
   calculating a packet transmission interval based on the transmission rate, wherein the packet transmission interval defines how often packets will be sent to achieve evenness in packet transmissions during a time period at the user specified packet transmission rate;
   receiving user selection to execute the network test transmitting packets specified in the network test over a network at the packet transmission rate, including
      preparing a packet including at least a payload and a header according to the packet creation information;
      directly accessing and checking a hardware counter to learn if the packet transmission interval has elapsed, wherein the hardware counter comprises a time stamp counter (TSC) register the included within processor that increments or counts at regular uniform intervals from when the processor is powered on and wherein directly accessing the hardware counter includes reading the TSC register using a routine located within a kernel of an operating system executing on the network card; and
      when the packet transmission interval has elapsed, sending the packet over the network.

* * * * *